(12) United States Patent
Vogt et al.

(10) Patent No.: US 7,922,393 B2
(45) Date of Patent: Apr. 12, 2011

(54) POROUS PLAIN BEARING WITH CONTINUOUS VARIATION OF THE BOREHOLE COMPRESSION

(75) Inventors: Andreas Vogt, Renningen (DE); Gerd Dornhofer, Leonberg (DE); Hans-Peter Koch, Stuttgart (DE); Werner Stehr, Horb-Ahldorf (DE); Christina Messner, Bruneck (IT); Peter Kronbichler, Reischach/Bruneck (IT); Kurt Goller, St. Georgen/Bruneck (IT); Heinrich Hecher, Antholz Mittertal (IT)

(73) Assignee: GKN Sinter Metals GmbH and Robert Bosch GmbH (DE)

( * ) Notice: Subject to any disclaimer, the term of this patent is extended or adjusted under 35 U.S.C. 154(b) by 0 days.

(21) Appl. No.: 11/972,099

(22) Filed: Jan. 10, 2008

(65) Prior Publication Data

US 2008/0144984 A1    Jun. 19, 2008

Related U.S. Application Data

(60) Division of application No. 11/233,208, filed on Sep. 22, 2005, now Pat. No. 7,343,681, which is a continuation of application No. PCT/EP2004/002729, filed on Mar. 17, 2004.

(30) Foreign Application Priority Data

Mar. 22, 2003   (DE) ................................. 103 12 873

(51) Int. Cl.
*F16C 33/04*    (2006.01)

(52) U.S. Cl. .......................... 384/279; 384/276; 384/902
(58) Field of Classification Search ................. 384/276, 384/279, 902
See application file for complete search history.

(56) References Cited

U.S. PATENT DOCUMENTS

| 3,140,131 | A | * | 7/1964 | Tann ............................. 384/279 |
| 3,445,148 | A |   | 5/1969 | Harris et al. .................. 308/237 |
| 4,290,655 | A |   | 9/1981 | Apuzzo et al. ................ 308/121 |
| 5,120,140 | A |   | 6/1992 | Nakagawa et al. ........... 384/279 |
| 5,945,050 | A |   | 8/1999 | Jeong ............................ 264/119 |
| 6,270,259 | B1 |  | 8/2001 | Burton .......................... 384/213 |
| 2003/0206670 | A1 | | 11/2003 | Maruyama et al. .......... 384/279 |

FOREIGN PATENT DOCUMENTS

| DE | 155917 | 7/1982 |
| DE | 39 22 052 A1 | 1/1991 |
| DE | 4225398 | 2/1994 |
| DE | 19937567 | 3/2000 |
| DE | 19947462 | 10/2000 |
| DE | 10107485 | 9/2002 |
| JP | 2003-096502 | 4/2003 |

* cited by examiner

*Primary Examiner* — William C Joyce
(74) *Attorney, Agent, or Firm* — Woodcock Washburn LLP

(57) ABSTRACT

The invention pertains to a plain porous bearing for motors and transmissions with a circular bearing bore that displays, distributed alternatingly across the bearing bore, highly compressed at least approximately closed-pore areas and slightly compressed, open-pore areas, where the bearing bore diameters of the highly and slightly compressed areas are at least approximately identical. Also provided is a procedure and device for production of the bearing.

4 Claims, 4 Drawing Sheets

POROUS PLAIN BEARING WITH CONTINUOUS VARIATION OF THE BOREHOLE COMPRESSION

CROSS-REFERENCE TO RELATED APPLICATIONS

This application is a division of U.S. application Ser. No. 11/233,208, filed Sep. 22, 2005 entitled "POROUS PLAIN BEARING WITH CONTINUOUS VARIATION OF THE BOREHOLE COMPRESSION", which is a continuation of PCT/EP2004/002729 filed Mar. 17, 2004, which claims priority to German Application Number 103 12 873.5 filed Mar. 22, 2003.

FIELD OF THE INVENTION

The invention pertains to a plain porous bearing for motors and transmissions.

BACKGROUND OF THE INVENTION

Plain porous bearings are utilized in many cases in motors and transmissions. Their production is cost-efficient and their application is easy. The limits of their area of application are specified by the maximum radial load. These radial loads depend on other bearing parameters such as e.g. the sinter materials, sliding speeds, lubricants, operating temperatures etc. In contrast to plain porous bearings, substantial slide bearings can usually be applied under higher radial loads and sliding speeds, since the lubricating film that builds up between the wave and the bearing can separate the friction partners under high loads as well. In the case of plain porous bearings, this works only conditionally, because under correspondingly high pressure, the lubricant will be compressed into the pores of the sinter material. This may lead to contact with foreign objects between the bearing and wave, increased friction, and ultimately to the breakdown of the bearing.

In the current state of the technology, a plain porous bearing per DE 199 37 567, among others, is known, which alternately distributes a highly compressed bearing bore with small porous contact surfaces, and axially-running, slightly compressed open-pore lubricant depots. By that invention, the lubricant depots are designed with at least two lengthwise grooves. The disadvantages of such plain porous bearings are that under specific operating conditions, a comparatively strong noise development occurs, because during operation the oil film can be stripped onto the groove, thereby no longer guaranteeing the supply of lubricant to the bearing gap.

This also applies to a plain porous bearing per DE 199 47 462 in which the grooves are bent in an acute angle towards the axle center of the bearing bore. DE 101 07 485 also depicts a plain porous bearing with the previously listed disadvantages.

In equivalent plain porous bearings corresponding to the state of the technology, the contact surfaces exhibit so-called hydrodynamic lubrication during operation, whereby, due to rising pressure, a separating lubricant film develops between the wave and the bearing. However, in the area of the open-pore zones the lubricant film is compressed into the open pores of the sinter material such that the wave in these areas is operated in what is called the mixed friction state. In this operating condition, among others, friction and wear are greater than during hydrodynamic operation.

The task of the invention is to reconcile the advantages of the substantial slide bearing (low friction, high sliding speeds) with those of the plain porous bearing by maintaining the advantages of the plain porous bearing (durability, lubrication through the lubricant deposited in the sinter material).

SUMMARY OF THE INVENTION

This task is accomplished per the invention by means of a plain porous bearings for motors and transmissions with a circular bearing bore in which the bearing bore exhibits alternatingly distributed highly compressed and at least approximately closed-pore areas, and slightly compressed open-pore areas across the circumference. The bore diameter of the highly and slightly compressed areas should be at least approximately identical. The highly compressed areas function as a track for a wave or an axle stored in the bearing bore. In the highly compressed areas, the pores between the powder parts are approximately or totally closed, such that the plain porous bearings according to the invention can be applied to substantial bearings as conventional plain porous bearings because when high pressure is applied, the lubricant cannot be pressed between the pores of the sinter material in the highly compressed areas. In contrast to plain porous bearings per the current state of technology, hydrodynamic lubrication is reached at low rpm. Therefore the plain porous bearings according to the invention can be utilized at the low rpm's under which known plain porous bearings are still in the mixed friction state that leads to higher wear. Thus, solid state contact between bearing and wave, which would lead to increased friction, increased wear, and ultimately to the breakdown of the bearing, can be prevented. In addition, in contrast to plain porous bearings per to the current state of technology, low viscosity oils can be used, since in the highly compressed areas the oil cannot penetrate the nearly closed pores. Thereby, the suitability of plain porous bearings, especially for the cold start, increases, because at low temperatures of approx. −40° C. good functionality can not be guaranteed for standard plain porous bearings when high viscosity oils are used. In spite of the application of low viscosity oils, sufficient load capacity is achieved. The present slightly or non-compressed areas exhibit the advantages of known plain porous bearings, in that lubricants can penetrate into the pores such that the slightly compressed areas also function as lubricant depots. Thus, service lifetime lubrication is achieved with only the lubricants deposited in the sinter material. The inhomogeneities of the track with regard to high and slight compression do not affect the lubricant supply, and most significantly, these inhomogeneities have no effect on the load direction neutrality of the bearing. According to the invention it is planned that the bearing bore diameter of the highly and slightly compressed areas be at least approximately identical. This means that according to the current state of the technology, no lubricant depots in the form of grooves or nuts have been planned. Possible differences in bearing bore diameter are the result of production inaccuracies and are found in the area of general roundness flaws. Because the bearing bore diameter is almost approximately identical, the lubricating film is prevented by a continuous change of the diameter from tearing off at a certain level, which can occur in plain porous bearings corresponding to the current state of the technology.

A preferable design of the invention provides for an identical bearing bore diameter of the highly and slightly compressed areas. Such a design has the advantage that there is no step between the slightly compressed and highly compressed areas, such that lubricant cannot be stripped at the step e.g. edge between the contact surface and the lubricant depot. This will increase the operational reliability and durability of the bearing.

Especially preferable versions of the invention call for the compression across the extent of the bearing bore between the highly and slightly compressed areas to be at least approximately continuously varied. In the slightly compressed areas, the compression corresponds at least approximately to the basic compression of the bearing. In the area of highest compression almost all pores are closed, such that nearly complete compression of the material is achieved on the bearing surface. Starting at the bore outward, compression decreases until, after a few tenths of a millimeter, it once again reaches the value of the bearing's basic compression. The plain porous bearing according to the invention displays continuous variation of the compression in the area of the bore between the highly and slightly compressed areas, whereby deviation in compression depends on the type of bearing profile and the extent of the material suppression. It is essential that erratic changes in compression between the highly and slightly compressed areas do not occur, which is known to be the case for plain porous bearings corresponding to the current state of the technology.

In a further advantageous version of the invention it is planned that the plain porous bearing should display at least two highly compressed and at least approximately closed-pore areas. It is especially advantageous when the quantity of such areas is determined in such a way that the functional range is ascertained for all load directions. The plain porous bearings according to the invention exhibit the advantage that the fiction bearing functions as a lubricant depot, because oil is stored in the pores and can appear in the slightly compressed areas.

In another advantageous design of the invention it is planned that the bearing display highly compressed, at least approximately closed pores and/or slightly compressed open-pore areas at least across one section of the bearing width. The highly compressed and slightly compressed areas from one bearing edge to the opposite edge, and their distance from each other, may vary. In addition, the intervals and widths in the bearing do not have to be constant but can be e.g. statistically varied.

In an especially beneficial design of the invention, it is planned that the bearing exhibit highly compressed and at least approximately closed-pore areas and/or slightly compressed, open-pore areas across at least half of the bearing width. A variation of compression in the axial direction and not merely in the circumferential direction is advantageous because, due to the inhomogeneous compression across the bearing's circumference, areas with differential load capacities develop: High load capacity in the strongly compressed areas, and a somewhat lower load capacity in the slightly compressed areas. Thereby, operability of the plain porous bearing in the direction of load transmission direction is prevented. Regarding so called edge runners, it is especially advantageous that the number of compressed areas be odd, such that non-coaxial built-in waves at the bearing edge are not situated exclusively on the slightly compressed areas. It has also been understood that the noise performance of the bearing is better than when there is an even number of compression zones.

In an additional beneficial design of the invention it is planned that the highly compressed, at least approximately closed areas and the slightly compressed, open-pore areas be arranged staggered against each other.

In an especially beneficial design of the invention, it is planned that for each highly compressed, at least approximately closed-pore area, a slightly compressed, open-pore area is arranged axially facing it. For staggered compression zones facing axially, where a highly compressed and slightly compressed area face each other, a wave located in the bearing always rests on the highly compressed area.

These problems are solved through a procedure for the production of a plain porous bearing whereby a tool is filled with powder, creating (by pressing) a green part with a bore of approximately similar sine profile in the circumference direction. The green part will be sintered and finally the bore will be given a circular boring geometry by means of calibration. It is advantageous, when no material suppression into the slightly compressed areas occurs during the calibration process. Here, the compression of the slightly compressed areas corresponds to the basic compression of the bearing, for example, 6.0 g/cm3 for an iron bearing. Maximum material suppression occurs in areas of high compression, where the goal is to close all pores. Therefore, at the bearing surface an almost complete compression of the material occurs. From the bore hole outward, compression decreases again until after a few tenths of a millimeter, it once again reaches the value of the bearing's basic compression. In a plain porous bearing per the invention with a diameter of 8 mm, material suppression of about 100-300 μm in the radial direction occurs during the calibration process. These values can still be adjusted for the material or for the boring diameter. A plain porous bearing with a continuous variation of the compression in the area of the bearing bore is created by means of the procedure per the invention. The variation and strength of the compression depends on the bearing's profile type and the extent of material suppression.

The mandrel form per the invention is sinusoidal in the circumferential direction and the invention-related upper and lower die have identical profiles. The result is a boring geometry varying in the circumferential direction. In addition, the sinusoidal profile displays a root circle (smallest bearing bore diameter) on the deepest locations and a tip circle (largest bearing bore diameter). The difference between the diameter of the root circle and the tip circle of the sinusoidal profile indicates the suppression degree of the material during calibration. During sintering, the diameter of the calibration mandrel will be adjusted across the dimension variation at the tip circle of the green part's boring profile. Thereby the zones in the bore whose diameter is smaller than the tip circle diameter will be compressed and a compression in the area of the root circle occurs only slightly or not at all. At the location of the highest compression almost all pores are closed.

In a beneficial design of the invention it is planned that powder be filled into a tool, and that through compression a green part in a bore with an approximately sinusoidal profile in the circumferential direction be created. Here, on each half of the bearing, one staggered sine profile is compressed about an angle towards the other sine profile. The green part will be sintered and finally, the approximate sine profile of the bore will be given circular bore geometry through calibration.

In a beneficial design of the invention it is planned that in the slightly compressed areas, powder be compressed to approximate the basic compression of the plain porous bearing, and that in the highly compressed areas, it be compressed to approximate the basic compression of the bearing material. This enables the pores in the slightly compressed area remain open so that the lubricant can be stored there. For example, the saturation of the bearing with lubricants can be achieved under a vacuum.

In an further design of the invention it is planned that powder be compressed by 100 to 300 μm in the radial direction. An at least approximately complete closure of the pores in the highly compressed areas is thereby achieved.

The task is also achieved by means of a device for the production of a plain porous bearing and for the implementation of the procedure which the invention concerns. A pressing tool is planned which consists of a matrix and a profiled mandrel on the outer circumference, to which an upper and lower die are attached, and where the mandrel's pattern and the die form a sine profile in the circumferential direction.

In a beneficial design of the invention a pressing tool is provided, consisting of a matrix and a profiled mandrel on the outer circumference to which an upper and a lower die with identical profiles are attached, where the pattern is a sine profile in the circumferential direction and the upper mandrel and the upper die are rotated about an angle and attached opposite of the lower mandrel and the lower die.

BRIEF DESCRIPTION OF THE DRAWINGS

The invention is illustrated by schematic drawings of design examples. The illustrations consist of.

DETAILED DESCRIPTION OF ILLUSTRATIVE EMBODIMENTS

Figure 1:
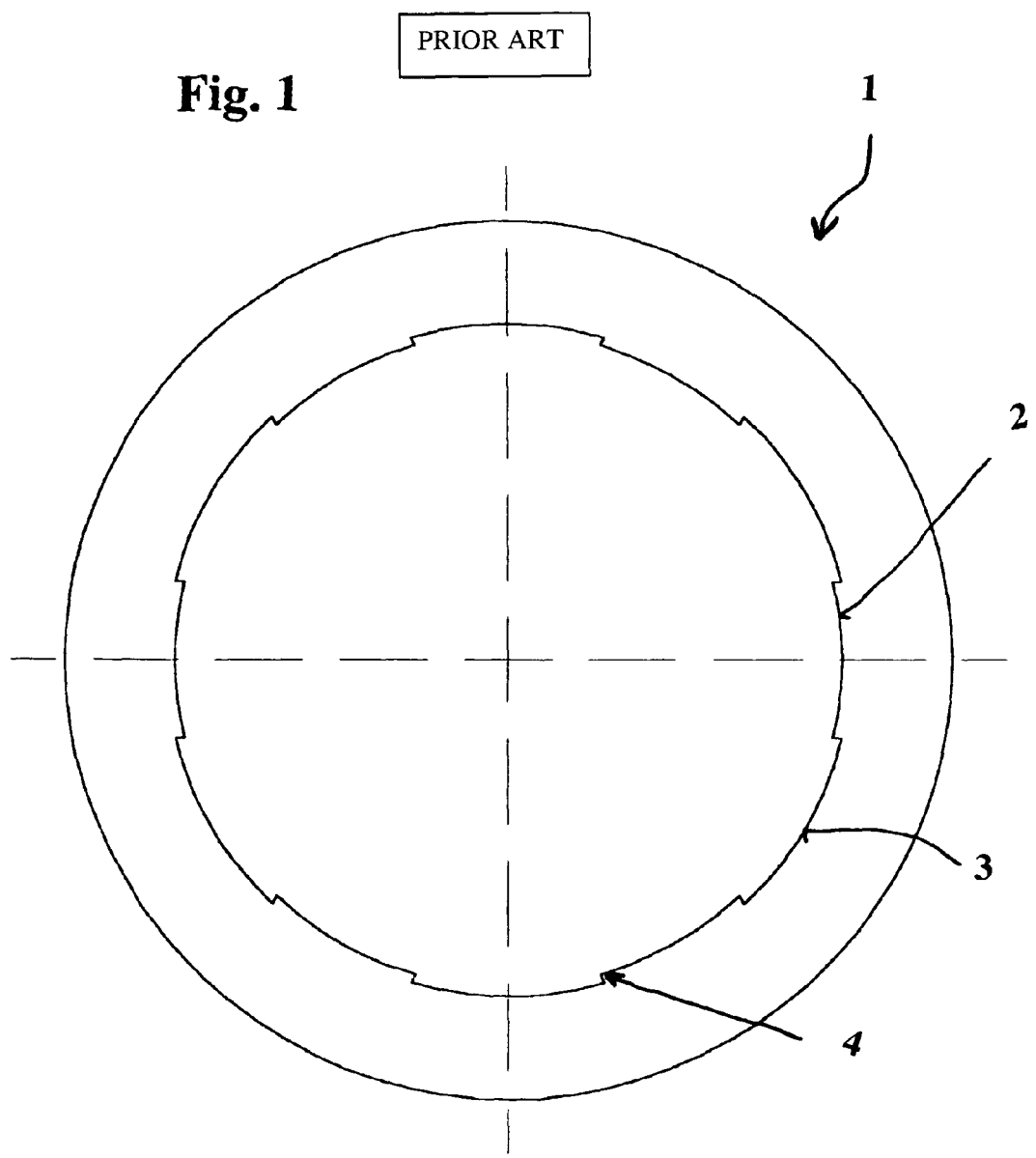
FIG. 1 illustrates a plain porous bearing according to the current state of the technology.

FIG. 1 illustrates plain porous bearing 1 according to the current state of the technology, e.g. of DE 199 37 567, of DE 199 47 462 and 101 07 485, whereby a crossover exists between the highly compressed areas 2 and the slightly compressed areas 3. Step 4 is sufficiently disadvantageous that during operation, the oil film on the step 4 may be stripped off such that the supply of lubricant to the bearing gap can no longer be guaranteed.

Figure 2:
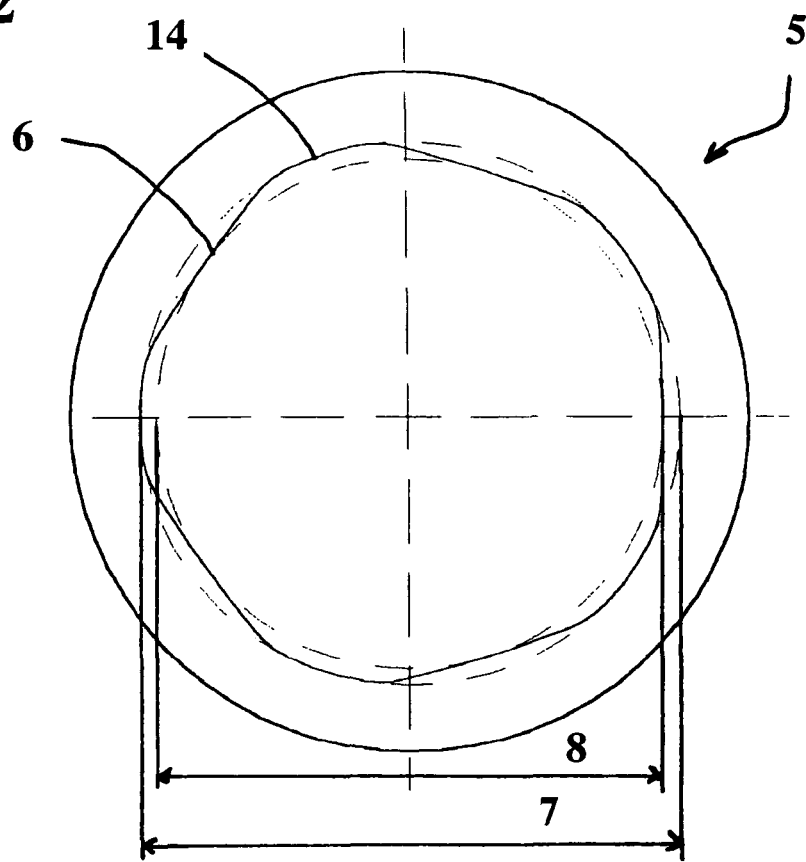
FIG. 2 illustrates a bore of bearing per the invention after sintering.

FIG. 2 illustrates bearing bore 14 of the invention-related plain porous bearing 5 after sintering. The sinusoidal profile 6 of the bearing bore is inserted into the form process and exhibits a root circle 7 (smallest bearing bore diameter) in the lowest areas, and on the highest areas a tip circle 8 (largest bearing bore diameter). The difference between the root circle 7 and the tip circle 8 of the sinusoidal pattern indicates the suppression degree of the material during calibration. The diameter of the calibration mandrel will be adjusted by sintering at the tip circle 8 of the bearing pattern of the green part to overcome dimensional variations. Therefore, zones in the bearing whose diameter is smaller then the tip circle diameter 8 will be compressed and a compression in the root circle 7 will occur only slightly or not at all. At the area of the highest compression almost all pores will be closed.

Figure 3:
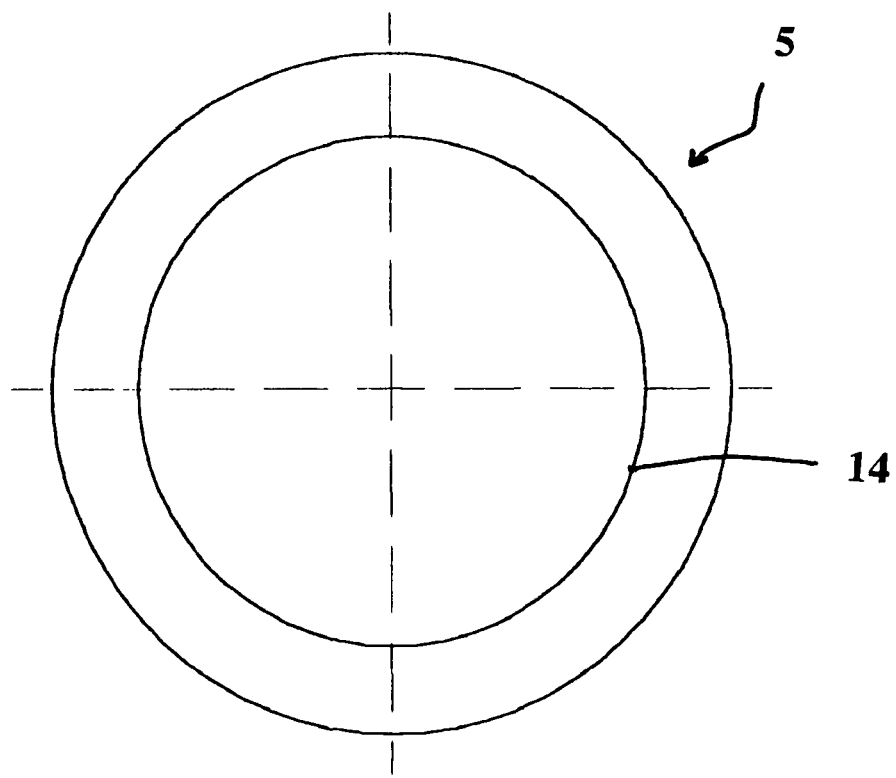
FIG. 3 illustrates a bore of the bearing per the invention after calibration.

FIG. 3 illustrates the bearing bore 14 of the invention-related plain porous bearing 5 after calibration, whereby the sinusoidal pattern 6 of the bearing bore 14 according to FIG. 2 was transformed through calibration into circular bearing bore 14.

Figure 4:
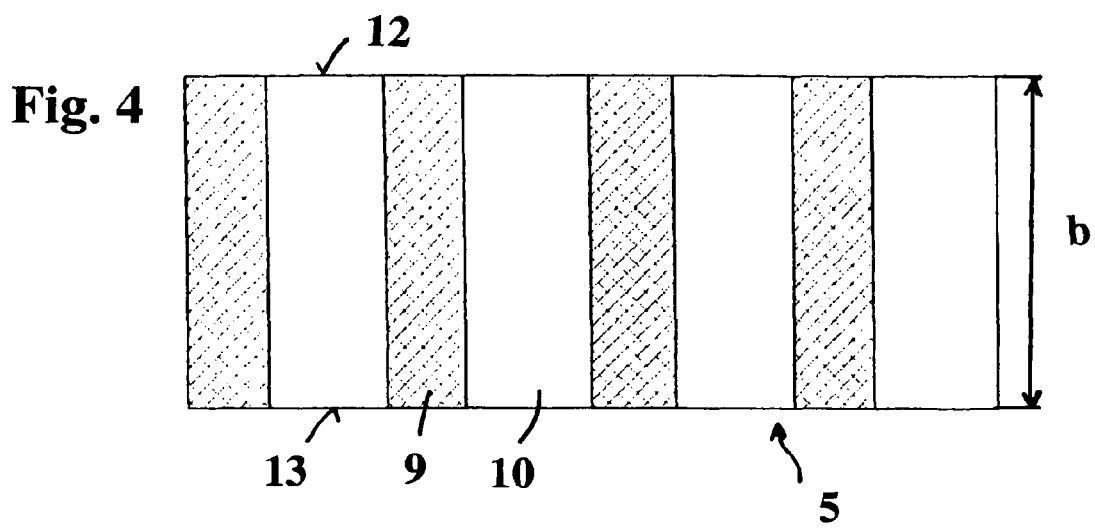
FIG. 4 illustrates a process for creating a bore for the bearing with differentially compressed zones and axial variations.

FIG. 4 illustrates the process for creating the invention-related bearing bore 14 with differentially compressed areas 9 and 10, whereby the hatched areas depict the more highly compressed zones 9. The slightly compressed areas 10 are not hatched. The zones with differential compression start at the top edge 12 and continue to the bottom edge 13.

Figure 5:
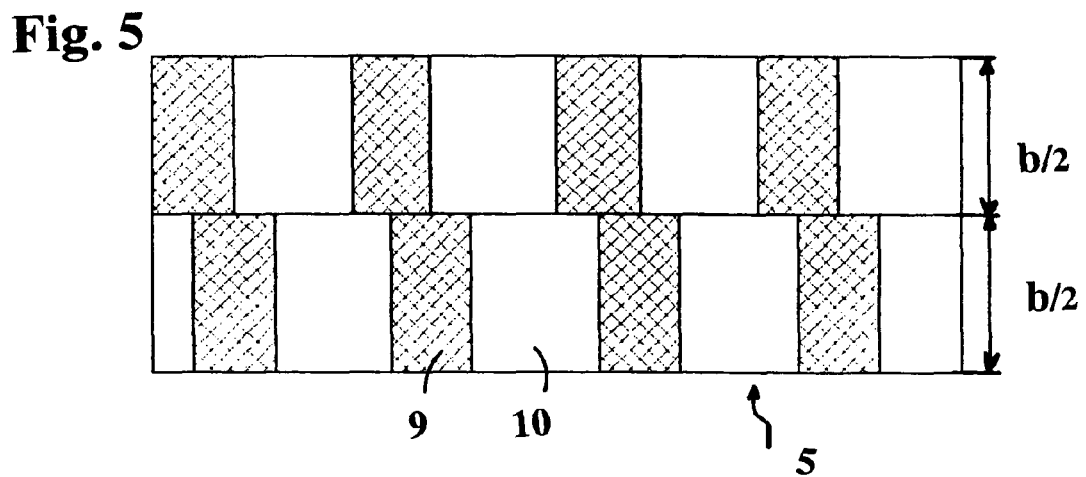
FIG. 5 illustrates a process for creating a bore for the bearing with differentially compressed zones with overlapping axial variations.

FIG. 5 illustrates the process for creating the invention-related bearing bore 14 with differently compressed areas 9, 10, where, starting at the middle of the bearing width b the compression zones are rotated against each other at a given angle. This guarantees that a wave situated in bearing 5 (not illustrated) will always come to rest on a highly compressed area 9.

Figure 6:
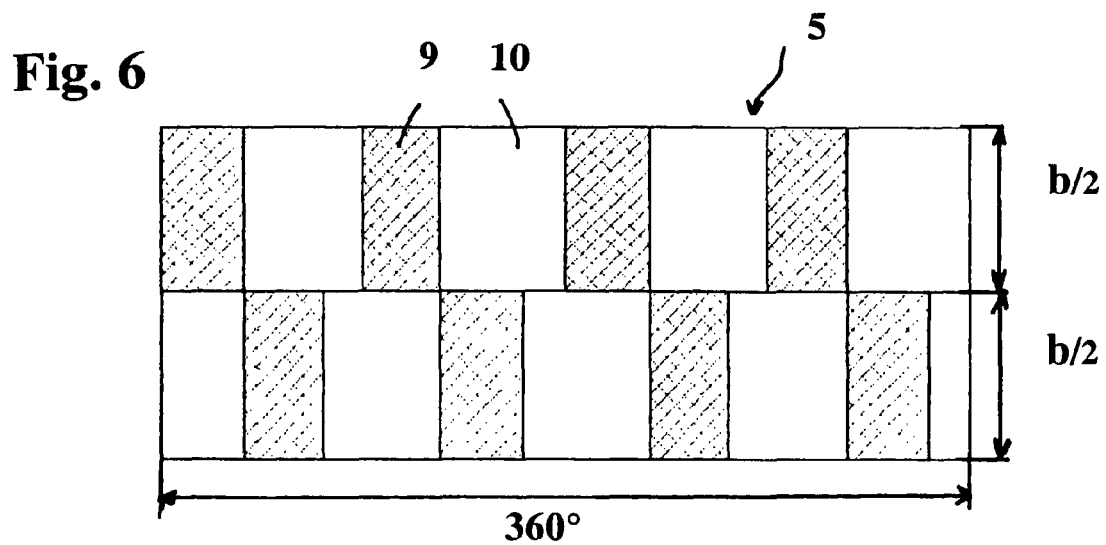
FIG. 6 illustrates a process for creating a bore for the bearing with differentially compressed zones with non-overlapping axial variations.

FIG. 6 illustrates a process for manufacturing the invention-related bearing bore 14 with differentially compressed areas 9, 10, where the highly and/or slightly compressed areas 9, 10 no longer overlap in the axial direction, in contrast to FIG. 5. The width of more highly compressed area 9 and the distance between them may vary. In bearing 5, the intervals and widths also need not be constant but e.g. can be statistically varied. The minimal width of the slightly compressed areas 10 is dictated by technical production limitations. When the number of areas increases and the boring diameter decreases, more material is moved into the areas of low compression during calibration. In an extreme case this leads to a closure of pores. As a result, the minimum width has to be selected in such a way that the pores do not become closed in the desired, slightly compressed areas 10, in order to maintain functionality as a lubricant depot. For example, for a bore diameter of 8 mm, the space between two points of higher compression in the circumferential direction should be no less then 3.5 mm.

Given that material suppression should not occur in the slightly compressed area during calibration, the compression of the slightly compressed area 10 corresponds to the basic compression of the bearing, e.g. 6.0 µ/cm3 for an iron bearing.

Maximum material suppression takes place in the area of highest compression 9, where the goal is to close all pores. Thus, the natural full compression of the applied material will be achieved on the bearing surface. From the bore in, the compression decreases again, until after a few tenths of a millimeter, it reaches the bearing's base compression value again. For example, for a bearing diameter of 8 mm during the calibration process, a suppression of the material of 100 up to 300 µm takes place in the radial direction.

Figure 7:
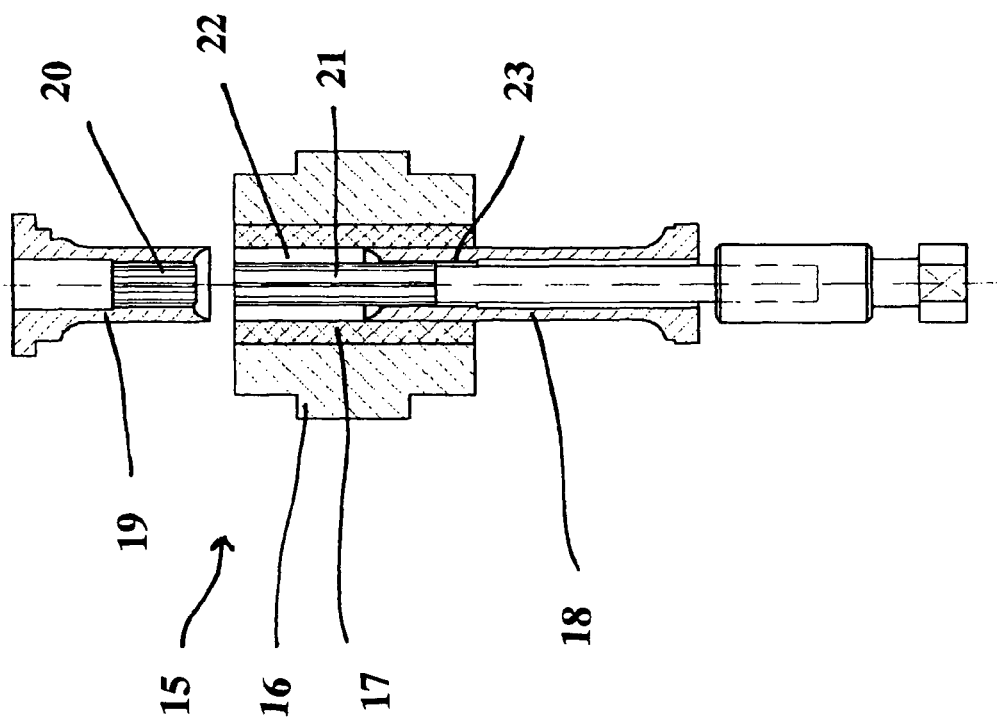
FIG. 7 illustrates a cross section of a pressing device per the invention in filled condition.

FIG. 7 illustrates a cross section of an invention-related press device in filled state. The press device consists of a matrix 16 with a carbide insert 17. Furthermore, a lower die 18 and an upper die 19 is provided for. The lower die 18 exhibits a bore 23, and the upper die a bore 20, both having a sinusoidal profile. A mandrel 21 exhibiting an identical sinusoidal pattern has been attached to the lower die 18 and the upper die 19. In the filled state powder will be added to form area 22, which is formed through the carbide insert 17, the lower die 18, and the mandrel 21. Mold pressure is applied to the upper die 19 and/or the lower die 18, such that the powder is compressed into a green part, which, depending on the sinusoidal pattern of the mandrel 21, the lower die 18, and the upper die 19, will then exhibit a bearing bore 14 with a corresponding sinusoidal pattern 6.

Figure 8:
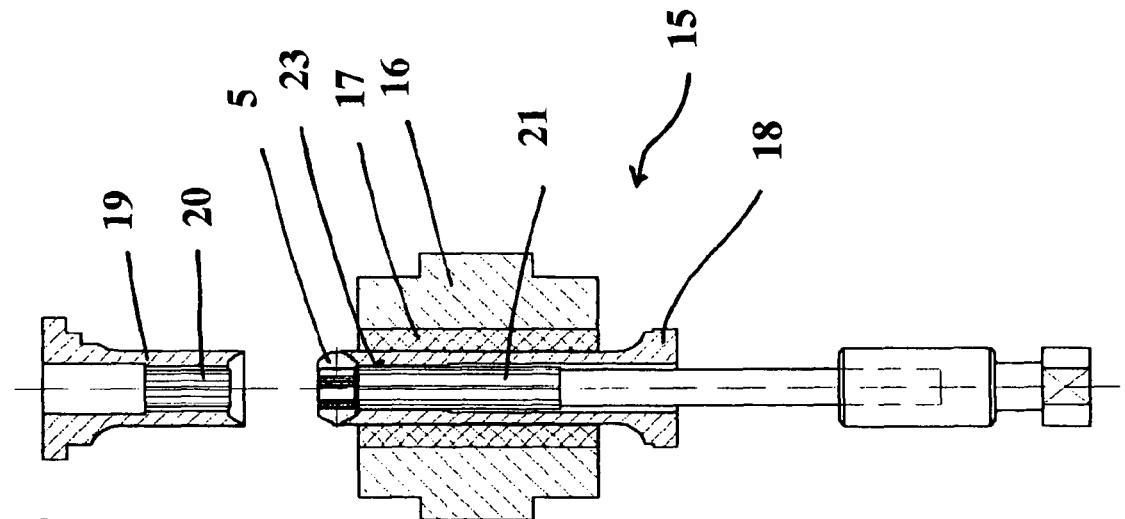
FIG. 8 illustrates a cross section of a pressing device per the invention in output condition.

FIG. 8 illustrates a cross-section of invention-related press device 15 during extrusion of the pressed green parts displaying a bearing bore 14 according to FIG. 2. During extrusion, the upper die 19 will be retracted from the matrix and the green part will be extruded by the lower die 18. Afterwards, the green part will be sintered. If needed, such burrs as may have developed will be removed.

During the manufacture of the green part, a bore geometry with a sinusoidal pattern 6 in the circumferential direction will be created. Bore geometry with a sinusoidal pattern permits, after the sintering process (not shown), the creation of a circular bore geometry for the bearing bore 14 with differentially compressed areas 9, 10. The bearing bore with the sinusoidal pattern 6 will be calibrated with a circular calibration mandrel, such that circular bearing bore 14 per FIG. 3 is created in plain porous bearing 5. The degree of compression of the highly compressed areas 9 can be adjusted by dimensioning the form tools, i.e. upper die 19 and mandrel 21. Axial variation in the compression of the bearing bore 14 in plain porous bearing 5, per FIG. 5 or FIG. 6, will be realized in the bore through two staggered mandrels 21 and dies 19 that face each other.

Per to the invention, a green part will be pressed with a press tool, such that form mandrel 21 and form die 19 display a geometry with a sinusoidal pattern in the circumferential direction. In case the compression in bearing bore 14 should also be varied in the axial direction, two staggered form mandrels 21, as well as dies 18, 19, set facing each other, will be used. Bearing bore 14 with sinusoidal pattern 6 in the circumferential direction will be calibrated with a circular calibration mandrel to achieve strict tolerances. The smooth bearing surface and the (partly) highly compressed areas 9 of the bearing bore 14 will thus be created. Subsequently, bearing 5 will be saturated with lubricants in a vacuum.

Plain porous bearings 5 per the invention can be used for the same purposes as those plain porous bearings known in the current state of the technology. They can especially be applied in all types of electric motors, whereby low viscous oils can be utilized, improving performance when "cold starting" a motor. The plain porous bearings per the invention already run in the hydrodynamic range at low rpm's, and because of the at least approximate circular bearing bore, \separation of the lubricant film from the edges of the lubricant depot will be avoided.

What is claimed:

1. A porous plain bearing for motors and transmissions, the bearing having a circular bearing bore that includes alternatingly distributed (i) highly compressed generally closed-pore areas, and (ii) slightly compressed open-pore areas, the bearing bore diameter at the highly compressed areas is at least approximately equal to the bearing bore diameter at the slightly compressed areas, wherein the compression about the circumference of the bearing bore between the highly and slightly compressed areas is continuously varied such that the bearing bore has a non-linear density gradient.

2. The bearing according to claim 1, wherein the bearing bore includes highly compressed, generally closed-pore areas across approximately half of the bearing width.

3. The bearing according to claim 1, wherein the bearing bore includes slightly compressed open-pore areas across approximately half of the bearing width.

4. The bearing according to claim 1, wherein in each instance of a highly compressed, generally closed-pore area, there is a slightly compressed open-pore area axially attached on the opposite side.

* * * * *